US008843968B2

(12) United States Patent
Jaramillo

(10) Patent No.: US 8,843,968 B2
(45) Date of Patent: Sep. 23, 2014

(54) SYSTEMS AND DEVICES FOR CONTROLLING A SATELLITE TELEVISION OUTDOOR UNIT VIA A NETWORK

(75) Inventor: Harold Jaramillo, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 880 days.

(21) Appl. No.: 12/486,657

(22) Filed: Jun. 17, 2009

(65) Prior Publication Data

US 2010/0325671 A1 Dec. 23, 2010

(51) Int. Cl.
H04N 7/20 (2006.01)
H04H 20/74 (2008.01)
H04N 21/61 (2011.01)

(52) U.S. Cl.
CPC ............ *H04N 7/20* (2013.01); *H04N 21/6143* (2013.01)
USPC ................. 725/63; 725/68; 725/72; 455/3.02

(58) Field of Classification Search
None
See application file for complete search history.

(56) References Cited

U.S. PATENT DOCUMENTS

| 5,613,191 | A | 3/1997 | Hylton |
| 6,377,782 | B1 | 4/2002 | Bishop |
| 6,647,015 | B2 | 11/2003 | Malkemes et al. |
| 6,978,474 | B1 * | 12/2005 | Sheppard et al. ............... 725/83 |
| 7,477,871 | B1 * | 1/2009 | Gurantz et al. ............... 455/3.01 |
| 2004/0060065 | A1 * | 3/2004 | James et al. ..................... 725/71 |
| 2007/0124789 | A1 * | 5/2007 | Sachson et al. ............... 725/117 |

OTHER PUBLICATIONS

Wikipedia "IEEE 802.15.4-2006," Mar. 21, 2009; retrieved from the Internet at http://en.wikipedia.org/wiki/IEEE_802.15.4 on Apr. 29, 2009.
European Telecommunications Satellite Organization "Digital Satellite Equipment Control {DiSEqC}: Bus Functional Specification," Ver. 4.2, Feb. 25, 1998.
Entropic Communications "RF5219: Satellite Channel Stacking Switch (CSS)," May 2008.
Troy Brandon, Entropic Communications "Changing DBS Delivery—The Single Wire Solution," 2008.
Troy Brandon, Entropic Communications "CSS & MoCA Combine to Deliver Competitive Advantages to DBS Operators," 2008.
Entropic Communications, White Paper "Digital Broadcast Satellite Systems: The Benefits of Channel Stacking Switch Technology," Oct. 2005.
Frank, Jonathan A. "Systems and Methods for Wirelessly Transmitting Television Content Received Via a Satellite Antenna," U.S. Appl. No. 12/133,255, filed Jun. 4, 2008.

* cited by examiner

*Primary Examiner* — Mark D Featherstone
(74) *Attorney, Agent, or Firm* — Ingrassia Fisher & Lorenz, P.C.

(57) ABSTRACT

Various systems and methods allow control information to be provided between a set top box (STB) or other receiver and the outdoor unit (ODU) associated with the satellite antenna over a control network in a network format, such as an IEEE 802.15.4 or other peer-to-peer network format. The ODU includes a network interface that receives instructions from the television receiver via a control network in a peer-to-peer network format. Received satellite broadcast signals are received, converted, demodulated or otherwise processed in response to the instruction received via the control network. The resulting signal is transmitted across a cable connection to the television receiver to thereby allow viewing of the television content by the viewer.

7 Claims, 2 Drawing Sheets

SYSTEMS AND DEVICES FOR CONTROLLING A SATELLITE TELEVISION OUTDOOR UNIT VIA A NETWORK

TECHNICAL FIELD

This document generally relates to satellite television systems, and more particularly relates to systems and methods for controlling an outdoor unit associated with a satellite television system using a network.

BACKGROUND

Most television viewers now receive their television signals through a content aggregator such as a cable or satellite television provider. For subscribers to a direct broadcast satellite (DBS) service, for example, television programming is received via a broadcast that is sent via a satellite to an antenna that is generally located on the exterior of a home or other structure. Signals received from the satellite are generally transmitted from the antenna over a coaxial or similar cable to a set-top box (STB) or other receiver associated with the viewer's television. The receiver is then able to extract the desired channel from the content received over the cable connection from the antenna. Typically, the STB or other receiver transmits control signals over the same coaxial cable to the ODU to obtain the programming desired by the viewer.

While DBS systems have been widely deployed with great commercial and technical success, command and control of the ODU remains a challenge in some settings. In particular, a dedicated cable connection between the ODU and each receiver is typically needed to facilitate content transfer and control of the ODU. Typically, the receiver controls the ODU using a command protocol such as Digital Satellite Equipment Control (DiSEqC), a frequency-shift-keying (FSK)-based scheme, or the like. Conventional protocols for equipment control typically allow only a single receiver or other master to control one or more slave ODU devices, however. In homes or other installations that include multiple receivers, then, each receiver typically has a dedicated cable connection to the ODU to accommodate this single master limitation. Sharing ODU equipment between multiple receivers therefore typically involves placing dedicated cables between the ODU and each of the receivers. Moreover, both the ODU and the receiver typically need dedicated hardware and software to facilitate DiSEqC or similar control.

It is therefore desirable to create more efficient systems, devices and methods for controlling the ODU from the STB or other receiver(s). These and other desirable features and characteristics will become apparent from the subsequent detailed description and the appended claims, taken in conjunction with the accompanying drawings and this background section.

BRIEF SUMMARY

Various systems and methods allow control information to be provided between the receiver and the outdoor unit associated with the satellite antenna to be provided over a control network in an appropriate network format, such as an IEEE 802.15.4 or other peer-to-peer network format. This allows for improved command and control of the ODU in some embodiments, and may also facilitate daisy-chained or other more convenient cabling architectures by allowing multiple STBs or other receivers to at least partially share cabling to the outdoor unit.

Many different aspects and embodiments could be formulated. As an example, some embodiments provide a system for providing television content received via a satellite antenna for viewing on a television by a viewer. The system suitably comprises an outdoor unit coupled to the satellite antenna and to a cable, as well as one or more set top boxes or other television receivers. The outdoor unit is appropriately configured to receive and process one or more satellite signals from the satellite antenna and to transmit the resulting signal via the cable. The outdoor unit is further configured to receive a control signal via a control network and to adjust the receiving and/or processing of the satellite signal in response to the control signal. The television receiver is coupled to the cable and to the television, and is configured to receive the signal from the outdoor unit. The receiver is also configured to process the signal from the outdoor unit to thereby provide the television content to the television for viewing by the viewer, to receive control instructions to adjust the television content from the viewer, to generate the control signal based upon the control instructions received from the viewer, and to transmit the control signal to the outdoor unit over the control network. Various examples of control networks used with some embodiments could include IEEE 802.14.5 networks, ZIG-BEE networks, and/or any other types of peer-to-peer or other networks, as desired.

Other exemplary embodiments provide a television receiver for providing television content received via a satellite antenna for viewing on a television by a viewer. The receiver comprises a first interface to a cable that couples the television receiver to outdoor unit associated with the satellite antenna, a second interface that is configured to receive control instructions from the viewer from a remote control, and a controller. The controller is appropriately configured to receive the viewer instructions via the second interface, to generate a control signal in a network format based upon the control instructions received from the viewer, to transmit the control signal to the outdoor unit over a control network, and to receive a signal from the outdoor unit that is processed to thereby provide the television content to the television for viewing by the viewer.

In still other embodiments, an outdoor unit used in providing television content received on a satellite antenna to a television receiver for presentation to a viewer. The system comprises a network interface and a signal converter. The network interface is configured to receive and process an instruction from the television receiver via a control network, wherein the instruction is received in a peer-to-peer network format. The signal converter is configured to receive a satellite broadcast signal and to convert the received signal into a converted signal for transmission on a cable connection in response to the instruction received from the control network. A cable interface to the cable connection coupling the system to the television receiver is also provided, wherein the cable interface is configured to transmit the converted signal across the cable connection to thereby allow viewing of the television content by the viewer.

Various other embodiments, aspects and other features are described in more detail below.

BRIEF DESCRIPTION OF THE DRAWING FIGURES

Exemplary embodiments will be described in conjunction with the drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a set-top box (STB) or other television receiver provides command and control communications to an outdoor unit (ODU) associated with one or more satellite antennas using a network. The network may be, for example, a peer-to-peer network that allows intercommunication between one or more receivers and any types of ODU using a common networking protocol in which any node communicating on the network can initiate communications with other nodes. Any of the various IEEE 802.15.4 protocols for personal area networks (PANs), including the ZIGBEE protocol, could be used in various embodiments; other embodiments may use IEEE 802.15.1 ("BLUETOOTH"), IEEE 802.11 ("WI-FI"), Multimedia over Coax Alliance (MoCA) protocols, and/or any other network protocols and formats, as appropriate.

As noted above, many conventional satellite television implementations use point-to-point communications schemes for controlling the ODU from the receiver. Protocols such as DiSEqC, for example, use a master/slave model that is not scalable to multiple receivers, thereby limiting the wiring options that are available from multi-receiver installations. By allowing communications over a logical network rather than a conventional point-to-point system, however, more flexible wiring schemes could be formulated, including daisy-chained or other arrangements in which signals intended for more than one receiver are transmitted over a common signal path. This greatly reduces the need to run dedicated cabling in some situations. While some embodiments may provide command and control signaling over a wireless network connection, other embodiments may use hardwired cabling (such as the cabling used to transmit programming content) to physically transmit control signals in the network format. This effectively increases the range of so-called "personal area networks" (PANs) that are otherwise typically deployed in relatively short-range environments. These and various other features available from different embodiments are described fully below.

Figure 1:
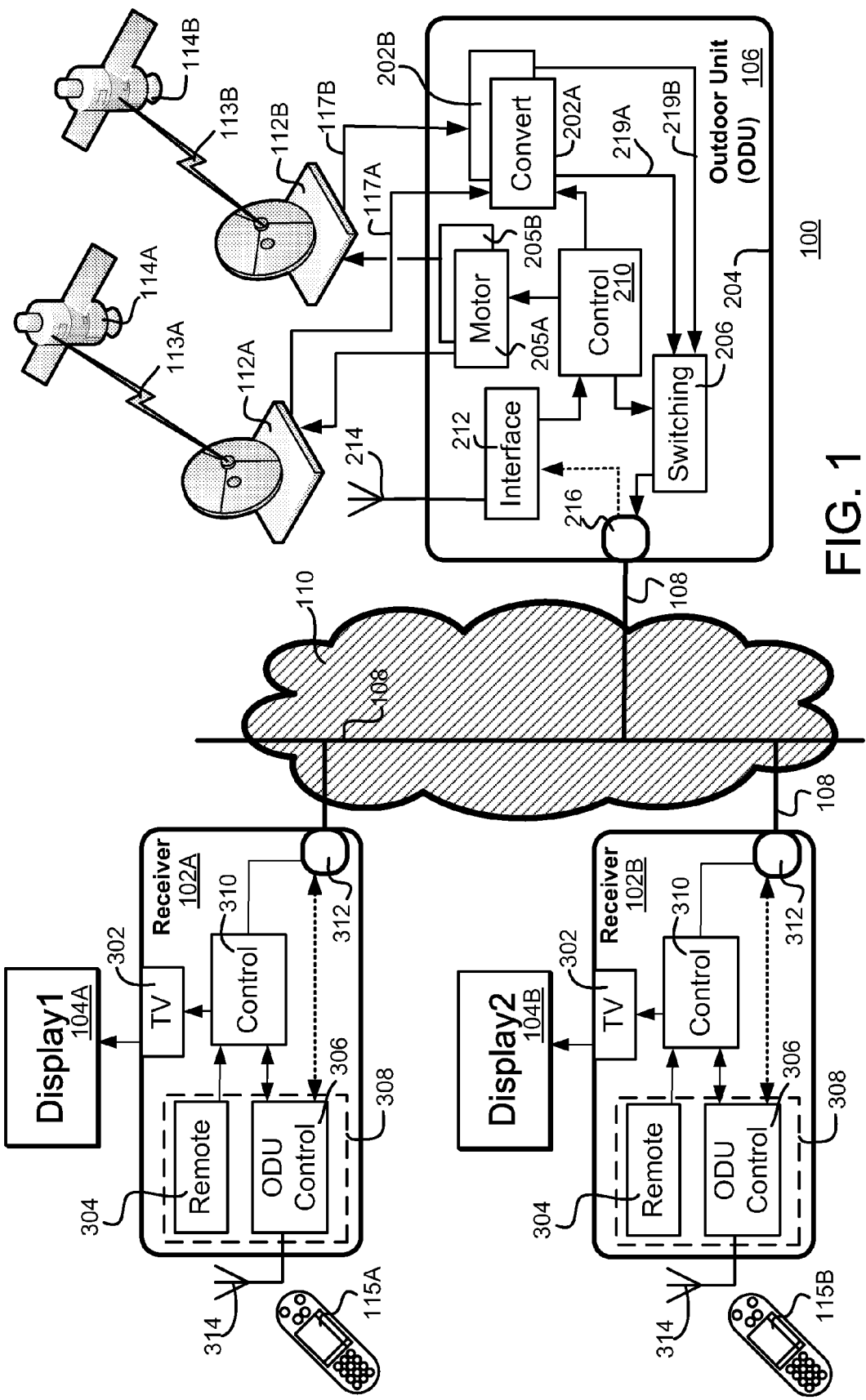
FIG. 1 is a diagram of an exemplary system for providing television content using a network for command and control of the outdoor unit.

According to various embodiments and with reference to FIG. 1, a satellite television system 100 suitably includes one or more antennas 112A-B that receive downlink signals 113A-B from one or more satellites 114A-B (respectively). Signals 113 received using any antenna 112 are frequency-converted, demodulated or otherwise processed before being transmitted from an outdoor unit (ODU) 106 associated with the antenna 112 to one or more set-top boxes (STBs) or other receivers 102A-B. Typically, this converted content is provided over a coaxial or other type of cable connection represented in FIG. 1 by cabling 108. Generally speaking, ODU 106 provides such functions as receiving and converting a particular transponder or other portion of downlink signal 113. ODU 106 may also demodulate, switch and/or otherwise process the received signal prior to providing the converted signal to the receiver 102A-B for further processing. ODU 106 may also position antenna(s) 112A-B and/or provide switching between multiple antennas 112A-B or receivers 102A-B in some implementations.

The STB or other receiver 102 controls the programming provided on display 104 in response to viewer inputs. Generally, the viewer selects desired programming available from downlink signal 113 by providing control instructions using a remote control 115 or other input device that communicates with receiver 102. The control instructions provided by the viewer are then used within receiver 102 to select desired channels or other programming from available content. For example, the viewer's instructions may indicate a desired channel that is contained within a satellite transponder signal available to the receiver 102. Receiver 102 then directs the ODU 106 to provide the appropriate signal so that the desired programming can be extracted and presented on display 104.

Receiver(s) 102A-B therefore transmit command and control messages to ODU 106 to direct the positioning of antenna 112, the frequency-converting, demodulation and/or other processing of particular transponder signals at the ODU, and/or to perform other functions as desired. In various embodiments, command and control messages are transmitted between one or more receivers 102A-B and ODU 106 using a control network 110 in which communications take place using pre-defined protocols, such as any of the various protocols defined in IEEE standard 802.15.4 or the like.

In contrast to the many conventional systems currently used in many satellite systems, various embodiments provide peer-to-peer type network architectures that allow multiple components to communicate using a common medium and protocol without a "master" node or the like controlling access to the network. Typically, each node operating on the peer-to-peer network has the same capabilities as the other nodes so that any node can initiate a communications session with another node. Many conventional IEEE 802.15.4 networks, for example, provide real-time suitability through guaranteed time slots, as well as collision avoidance through carrier sense multiple access/collision avoidance (CSMA/CA) features. Such protocols may also support secure communications, signal quality monitoring and/or any other features as desired.

By using a peer-to-peer type network 110 instead of a master/slave system, multiple components (e.g., multiple receivers 102A-B and/or multiple ODUs 106) can inter-communicate with each other on a common medium. This reduces or eliminates the need for dedicated connections between each receiver 102A-B and the ODU 106, thereby allowing multiple receivers 102A-B to share cabling 108. Cabling 108 may be daisy-chained or otherwise interconnected between multiple receivers 102A-B within an installation, for example, rather than requiring dedicated lines to be run between each receiver 102A-B and each associated ODU 106.

Many different types of control networks 110 could be formulated in any number of alternate embodiments. Conventional IEEE 802.15.4 wireless networks, for example, could provide communications between any number of receivers 102A-B and ODU 106 devices as desired. These protocols may include, for example, the ZIGBEE protocol that describes the operation of a personal area network (PAN). Other protocols built upon 802.15.4 physical or media access features could include, without limitation, the MiWi and MiWi P2P protocols, the WirelessHART protocol and/or the like. Other protocols that could be used to formulate control network 110 could include the 6LoWPAN protocol described, for example, in RFC 4944. Other protocols that could be used include conventional or ETHERNET, TOKEN RING protocols, IEEE 802.11 ("Wi-Fi") protocols, IEEE 802.15.1 ("BLUETOOTH") protocols, MoCA protocols and/or the like. Alternate embodiments could use any other standard or non-standard network format that allows nodes to communicate via any wired, wireless or other connection using peer-to-peer, star network, or other constructs.

In other embodiments, IEEE 802.15.4 or other network protocols could be readily adapted to be transmitted on cable 108. In such embodiments, the physical layer properties of such protocols may be adapted or supplemented to allow messages to be transmitted via a hardwired connection (e.g., cabling 108) rather than a wireless connection. The media access, logical link and other layers of the protocol, however, could remain relatively unmodified. In other embodiments, cabling 108 simply provides a physical media for transmitting signals formed according to ZIGBEE or other protocols, thereby extending the range of the protocol in comparison to wireless broadcast of similar signals. Other embodiments could use conventional local area network (e.g., IEEE 802.3 ETHERNET or IEEE 802.5 token ring) protocols or other schemes to support connectivity using cabling 108. In still further embodiments, conventional network formats (e.g., ETHERNET formats, IEEE 802.15.4 formats) could be used to encapsulate data messages formed in accordance with other protocols (e.g., conventional DiSEqC protocols) that transmit data between receivers 102A-B and ODU 106. Communications associated with network 110, then, could be physically transmitted over any appropriate wired or wireless media, including cabling 108.

Each of the various components shown in FIG. 1 will now be described in additional detail. Other embodiments and implementations, however, could differ from the basic systems and constructs shown in FIG. 1 in any number of ways. Different embodiments could support single or multiple antennas 112A-B, for example, in communication with any number of receivers 102A-B. Cabling 108 may be present in any sort of daisy-chained, star, bus, point-to-point or other layout for distribution of television programming to the receivers 102. As noted above, however, the control network 110 used to transmit command and control information between receivers 102A-B and ODU 106 may physically transmit over any wired or wireless path, including any number of paths not shown in FIG. 1.

Antennas 112A-B are any antennas or sets of antennas capable of receiving downlink signals 113A-B from one or more satellites 114A-B (respectively) as desired. In various embodiments, each antenna 112 is a parabolic dish-type antenna such as any of the antennas conventionally used for digital broadcast satellite services, although alternate embodiments may implement one or more antennas 112 in any other manner. In other embodiments, one or more antennas 112A-B may represent antennas that receive over-the-air (OTA) terrestrial broadcast signals, such as conventional ATSC broadcast television signals as well as newer services available on other frequencies, such as the 700 MHz frequency band. Other sources of OTA programming may also be available for reception using one or more antennas 112A-B.

Although FIG. 1 shows ODU 106 as being separate from antenna(s) 112A-B, this is intended as a logical representation that may or may not represent physical separation or location of the various components. In some embodiments, some or all of ODU 106 may be physically integrated with a dish assembly or the like that is associated with antenna 112A-B. For example, some portions of ODU 106 (e.g., converter 202A-B) may be implemented with a conventional low noise block feedhorn (LNBF) or other structure that may be mounted on an arm (or other support) in proximity to a dish-type antenna. Other embodiments may incorporate switches, motors and/or other features in a separate housing or other structure that are capable of interacting with one or more satellite antennas 112A-B, LNBF converters 202A-B located with satellite antennas 112A-B, and/or the like. In some embodiments, each antenna 112 has an associated LNBF converter 202 that is physically located on an arm or other support in proximity to a dish-type antenna to allow for reception of signals 113. Each antenna 112 may be positioned by a separate motor 205, and signals 219 output from each converter 202 may be switched or otherwise routed to an appropriate receiver 102, as desired.

As shown in FIG. 1, ODU 106 suitably receives signals from antenna 112 and provides received and/or converted signals to one or more television receivers 102A-B over cabling 108. Cabling 108 may include one or more coaxial or other cable segments, and may also include any number of intervening switches, amplifiers, couplers and/or other conventional components used to inter-connect cable or satellite television components. While prior cabling 108 was typically implemented in a point-to-point manner to accommodate a single "master" node on each link, various embodiments may allow receivers 102A-B and ODU 106 to be inter-connected using a bus, star, token ring or other network-type arrangement in which signals transmitted to multiple receivers 102A-B travel on one or more common cable segments. For example, receivers 102A-B may be "daisy-chained" or otherwise serially connected in some embodiments to reduce redundant cabling, and to reduce the number of cables routed to the ODU 106. The signals transmitted on the common cabling may be modulated or otherwise adapted in any manner to allow for simultaneous transmission to multiple receivers 102A-B. Signals transmitted from ODU 106 to different receivers 102A-B may be modulated on separate carrier frequencies, for example. Alternate embodiments may use any sort of time, frequency, phase or other modulation to allow the multiple signals to be transmitted on common cabling without interfering with each other. Such carrier encoding or other modulation may also be used to accommodate command messages sent over cabling 108 as part of network 110 in some embodiments.

In a typical DBS implementation 100, outdoor unit (ODU) 106 includes one or more receiver/converter devices 202A-B, along with an interface 216 to the cabling 108 used to distribute the received signals. ODU 106 may also include any appropriate circuitry, components or logic for performing switching 206, control 210 and/or other functions as appropriate, and as described more fully below. The various components of the satellite antenna system 100 are generally found in relatively close physical proximity to each other (e.g., within a common housing 204 or other enclosure, or at least close enough for physical connection). ODU 106 may be implemented, for example, on the exterior of a home or other structure to facilitate line-of-sight to one or more satellites 114. Note that certain embodiments of ODU 106 may include duplicate components (e.g., converters 202A-B, motors 205A-B) to support multiple antennas 112A-B and/or receivers 102A-B. Alternate or additional features may be equivalently provided in other embodiments, or the various components shown in the figure could be physically or logically arranged and inter-connected in a manner that differs from that shown in the figure.

Converters 202A-B are any devices, modules, circuits or other logic capable of receiving signals 117A-B from one or more antennas 112A-B. In the exemplary embodiment shown in the figure, two converters 202A-B are shown, with each converter 202A-B receiving a signal 117A-B from a different antenna 112A-B. In such embodiments, each converter 202A-B typically receives a transponder signal from one or more satellites 114A-B and down-converts the received signal to a different carrier frequency that is more suitable for propagation to the STB or other receiver 102A-B over the coaxial or other cable 108. In various embodiments, converter 202 represents a conventional low-noise block feedhorn (LNBF) type component (which may be physically connected to the antenna 112A-B), although other embodiments may be implemented with different components or logic. Converter 202 may also perform additional or alternate functions (e.g., performing any sort of signal processing functions on received signals), as desired. For example, in some embodiments converter 202 may include the capability to demodulate the received signal 113 prior to transmitting a demodulated signal to receiver 102 on cabling 108. Other embodiments may include any number of converters 202A-B (including a single converter 202), and each converter 202 may be able to communicate with one or more satellites 114 as desired. Further, multiple converters 202A-B may be physically or logically combined into a common chip, component or device in some embodiments.

Switching 206 includes any hardware, software or other features used to switch signals 219A-B between one or more converters 202A-B or antennas 112A-B and one or more receivers 102A-B. In prior implementations, switching 206 was used to accommodate the single master limitation of DiSEqC and similar protocols. That is, the point-to-point connections from each receiver 102A-B were received at a coaxial switch or the like to allow for physical switching of signals on the various point-to-point cable links. The need for such switching may be reduced or eliminated in embodiments that allow signals transmitted to multiple receivers 102A-B to share common portions of cabling 108. Switching 206 may also accommodate signals 219A-B received from multiple antennas 112A-B, converters 202A-B and/or other components of ODU 106.

Cable interface 216 is any physical or logical interface to cabling 108. In various embodiments, cable interface 216 is a simple coaxial connector such as a conventional F-type, BNC or other connector. FIG. 1 shows ODU 106 as having a single interface 216 to cabling 108. In practice, ODU 106 may interface to any number of cables, including multiple point-to-point cable links to multiple receivers 102A-B. Interface 216 may be combined with switching 206 in some embodiments.

Various embodiments may include an appropriate motor 205 or other mechanical feature for repositioning antenna 112 as desired. Such repositioning may be useful in directing antenna 112 toward different satellites to increase the amount of content that can be received and viewed, to improve signal reception, and/or for any other purpose. In the exemplary embodiment shown in the figure, two different motors 205A-B are shown, with each motor 205A-B being able to position one of the two antennas 112A-B. Other embodiments may use any number of antennas 112 and associated positioning equipment 205 as desired.

The conversion, switching and/or other features of the ODU 106 may be controlled by any sort of control logic 210. In various embodiments, control logic 210 includes any sort of hardware, software, firmware or other logic capable of directing the various functions of ODU 106. Control logic 210 may include any sort of general or special-purpose microprocessor, microcontroller, digital signal processor or other programmable logic device, for example, with associated memory, input/output features and the like. Such logic typically execute software or firmware instructions that are able to process inputs received from network 110, to receive and convert signals 113 from the satellite antenna 112 in response to the received inputs, and to transmit the converted signal to the appropriate receiver 102A-B via cabling 108. Control logic 210 may be incorporated into converter 202 or any other component of ODU 106 in some embodiments, or may be otherwise physically or logically located in any other position other than the position shown in FIG. 1.

Interface 212 is any hardware, software, logical or other interface capable of receiving command and control instructions via control network 110. In various embodiments, interface 212 includes an IEEE 802.15.4 or similar wireless receiver, such as any of the various ZIGBEE receivers that can be commercially obtained from numerous sources. Such wireless receivers typically receive signals from an antenna 214, as appropriate for the particular protocols and frequencies used to propagate the wireless signals. Note that in many embodiments, housing 204 may be formed of metal or other materials that may produce Faraday effects, so antenna 214 may be positioned outside the housing 204, with an appropriate cable leading to interface or other processing circuitry inside the housing. As discussed above, various embodiments may transmit IEEE 802.15.4 or other signals via cabling 108 in place of, or in addition to, wireless transmissions. In such embodiments, interface 212 may interact with cable interface 216 or switch 206 rather than antenna 214 to place such signals on the cable 108, as desired.

ODU 106, then, receives command and control signals from one or more receivers 102A-B via control network 110. These commands are processed to position antenna(s) 112A-B as needed to obtain downlink signals 113A-B from particular satellites 114A-B, to frequency convert, demodulate and/or otherwise process the received signals 117A-B, and to provide the processed programming signal 219A-B to a particular receiver 102A-B over cabling 108. The receiver 102A-B then decodes, demodulates and/or otherwise further processes the received programming signals to present the decoded programming to the viewer on a display 104. Receivers 102A-B are also able to provide the control signals to the ODU using network 110, as described herein.

FIG. 1 shows one or more televisions or other displays 104A-B receiving display signals from one or more associated set-top boxes (STBs) or other receivers 102A-B. In a typical embodiment, viewer instructions provided by a remote control 115A-B are received and processed by receiver to obtain and decode programming that is desired by the viewer. These functions are commonly performed under the direction of any sort of control logic 310. Control logic 310 may include any sort of microprocessor, microcontroller, digital signal processor or other logic capable of directing the actions and processes of system 102. In various embodiments, receiver 102 is based upon a "system on chip" (SoC) implementation that incorporates a hybrid microcontroller with memory, input/output and other features to perform the various signal processing and other actions of the receiver 102. Various SoC and other integrated hardware implementations are available from Texas Instruments, Conexant Systems, Broadcom Inc., and many other suppliers as appropriate. Other embodiments, however, may implement controller 310 and/or the other features of receiver 102 with any number of discrete and/or integrated processing components (e.g., any sort of microprocessor or microcontroller), memories, input/output features and/or other features as desired.

In a conventional DBS television system, receiver 102A-B receives converted programming signals 219A-B from ODU 106 via cable 108. Such signals 219A-B may represent signals that are down-converted, demodulated and/or otherwise processed by ODU 106. The exemplary embodiment shown in FIG. 1, for example, shows each receiver 102A-B as having a cable interface 312 to cable 108. This interface may include any sort of F-type, BNC or other connector similar to cable interface 216 described above.

Receiver 102 in this embodiment also includes a display interface 302 for providing digital or analog television signals to display 104 in any conventional format. Examples of such formats may include, without limitation, component video, composite video, S-video, High-Definition Multimedia Interface (HDMI), Digital Visual Interface (DVI), IEEE 1394, and/or any other formats as desired.

Receiver 102 also includes a wireless or other interface 304 for communicating with a conventional remote control 115. In various embodiments, remote control 115 is an infrared (IR) remote control commonly used with many different types of televisions, STBs and other audio/visual components. In other embodiments, remote control 115 may be a radio frequency (RF) remote that communicates with interface 304 using any wireless communications protocols, such as IEEE 802.15.4 protocols or the like. In such embodiments, interface 304 may include any conventional transceiver for communicating via ZIGBEE, other IEEE 802.15.4, or other protocols. Any of the various transceivers available from any number of commercial sources, for example, could be used to facilitate communications between receiver 102 and an associated remote control 115.

Receiver 102 also communicates with ODU 106 via network 110, as described above. To that end, receiver 102 suitably includes any sort of appropriate interface 306 to facilitate communications in any appropriate network format. Interface 306 may include any sort of hardware, software, firmware or other logic used to support communications on network 110. As noted above, network 110 may be physically transported on cabling 108 in some embodiments; interface 306 would communicate (directly or indirectly) with cabling interface 312 in such embodiments. Alternately, communications on network 110 could be transmitted wirelessly (e.g., using antenna 314) using an appropriate wireless protocol (e.g., ZIGBEE or another IEEE 802.15.4 protocol, BLUETOOTH, Wi-Fi and/or the like). In other embodiments, communications could be transmitted over other wired or wireless connections from those shown in FIG. 1.

In embodiments that support communications between receiver 102 and remote 115 using IEEE 802.15.4 or other protocols, the interface 304 used to facilitate such communication may also support communications on network 110. Hence, interfaces 304 and 306 could coincide as a common transceiver or other interface 308 in some embodiments. To that end, remote 115 may considered as a node on network 110 in some embodiments; this may allow remote 115 to communicate directly with ODU 106, if desired. Alternately, communications between receiver 102 and remote 115 may take place over a logically separate network from control network 110 to separate communications between receiver 102 and remote 115 from communications between receiver 102 and ODU 106.

Figure 2:
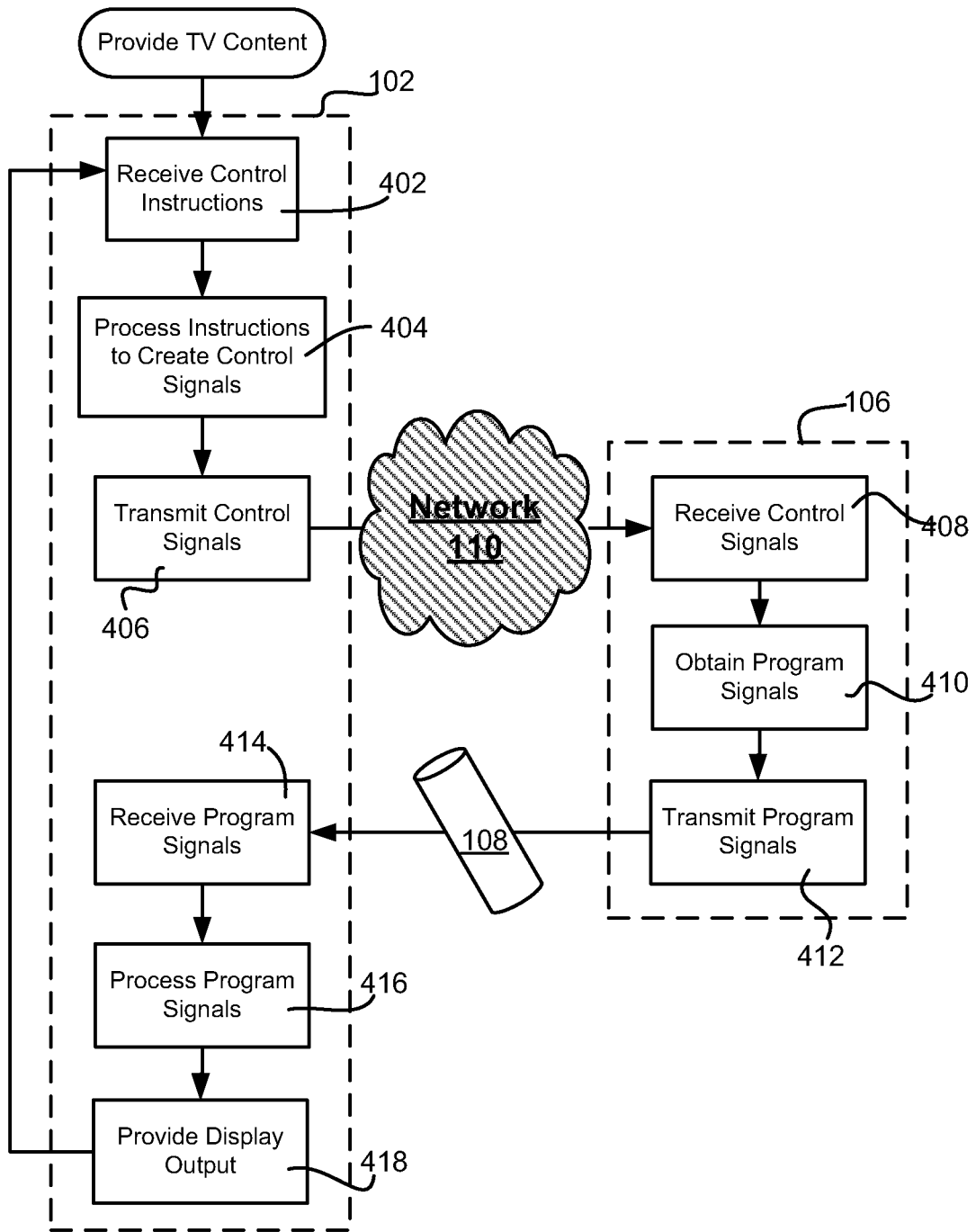
FIG. 2 is a flowchart of an exemplary process for providing television content using a network for command and control of the outdoor unit.

In operation, then, (and with reference to FIG. 2) a viewer typically selects desired programming for presentation on a display 104 using remote control 115 that is associated with a STB or other receiver 102. The receiver 102 typically receives the command instructions from the remote control at a remote interface 304 (function 402). These instructions are processed by control logic 310 or the like (function 404) to create command and control signals for ODU 106; these control signals are then transmitted via interface 306 (function 406) to ODU 106 over a control network 110. The ODU 106, in turn, receives the control signals over the network 110 (function 408), obtains the appropriate programming signals from the satellite downlink 113 or other source based upon the received control signals (function 410). This received signal may be frequency shifted, demodulated and/or otherwise processed as desired. The resulting programming signals 119 are transmitted (e.g., in a frequency converted and/or demodulated format) to the receiver 102 via cable 108 (function 412). The receiver 102 then receives the programming signal 219 (function 414), decodes or otherwise processes the signal received on the cabling 108 to extract the desired programming (function 416), and produces the viewer's desired output on display 104 (function 418). This basic process may be supplemented or modified in any number of ways to create many different, but equivalent, embodiments.

As noted above, the particular network 110 used to transmit the control signals may be any sort of peer-to-peer or other network that allows networked communicants to transmit and receive messages with each other without using a "master" node. Because the "master" node is no longer used in the network 110, multiple receivers 102A-B or other "master-type" devices can communicate using common cabling 108, thereby reducing or eliminating the need for isolated and dedicated wiring to each receiver 102A-B. As noted above, network 110 may be transmitted on cabling 108 in some embodiments; traffic in network 110 may alternately be wirelessly or otherwise transmitted between any number of receivers 102A-B and any component of ODE 106 across any other wired or wireless media.

Accordingly, various systems and techniques have been described for transmitting command and control information between a receiver associated with a television and the ODU associated with an antenna using a control network. While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A system for providing television content received via a satellite antenna for viewing on a television by a viewer, the system comprising:
    an outdoor unit coupled to the satellite antenna and to a cable, wherein the outdoor unit is configured to receive a satellite signal from the satellite antenna and to transmit a programming signal based upon the satellite signal via the cable, wherein the outdoor unit is further configured to receive a control signal via the cable, wherein the control signal is formatted in accordance with an 802.15.4 network format adapted for use over the cable, and to adjust the receiving of the satellite signal in response to the control signal;
    a television receiver coupled to the cable and to the television, wherein the television receiver is configured to receive the programming signal from the outdoor unit via the cable, to process the received signal to thereby provide the television content to the television for viewing by the viewer, to receive control instructions to adjust the television content from the viewer, to generate the control signal in the wireless network format based upon the control instructions received from the viewer, and to transmit the control signal to the outdoor unit over the cable to thereby adjust the receiving of the satellite signal.

2. The system of claim 1 further comprising a second television receiver coupled to the cable and to a second television, wherein the second television receiver is configured to receive a second programming signal from the outdoor unit via the cable, to generate a second control signal formatted in accordance with the wireless network format, and to transmit the second control signal to the outdoor unit over the cable.

3. The system of claim 1 wherein the control signal in the wireless network format is sent via wireless control network that is a logical network that is at least partially physically transmitted across the cable.

4. A television receiver for providing television content received via a satellite antenna for viewing on a television by a viewer, the receiver comprising:
    a first interface to a cable that couples the television receiver to an outdoor unit associated with the satellite antenna;
    a second interface that is configured to receive control instructions from the viewer from a remote control; and
    a controller configured to receive the viewer instructions via the second interface, to generate a control signal in a wireless network format based upon the control instructions received from the viewer, to transmit the control signal to the outdoor unit over a control network in which command signals from the television receiver are formatted in an 802.15.4 network format adapted for use over the cable and transmitted to the outdoor unit via the cable, and to receive a programming signal from the outdoor unit via the cable that is processed to thereby provide the television content to the television for viewing by the viewer.

5. The television receiver of claim 4 wherein the control signal is transmitted to the outdoor unit over the control network using the first interface.

6. An outdoor unit for providing television content received via a satellite antenna to a television receiver for presentation to a viewer, the outdoor unit comprising:
    a cable interface to a cable that couples the outdoor unit to the television receiver, wherein the cable interface is configured to receive and process an instruction from the television receiver received via the cable in an 802.15.4 network format adapted for use over the cable interface;
    a signal converter in communication with the satellite antenna, wherein the signal converter is configured to receive a satellite broadcast signal in response to the instruction received via the wireless control network and to convert the received signal into a converted programming signal for transmission to the television receiver via the cable to thereby allow viewing of the television content by the viewer.

7. The outdoor unit of claim 6 wherein the signal converter is configured to demodulate the satellite broadcast signal.

* * * * *